US007152096B2

(12) United States Patent
Yamamoto et al.

(10) Patent No.: US 7,152,096 B2
(45) Date of Patent: Dec. 19, 2006

(54) HIGH PERFORMANCE STORAGE ACCESS ENVIRONMENT

(75) Inventors: Akira Yamamoto, Cupertino, CA (US); Naoko Iwami, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 935 days.

(21) Appl. No.: 09/923,157

(22) Filed: Aug. 6, 2001

(65) Prior Publication Data

US 2003/0028729 A1 Feb. 6, 2003

(51) Int. Cl.
G06F 15/167 (2006.01)
H04J 11/00 (2006.01)

(52) U.S. Cl. .................. 709/215; 711/111; 711/6; 711/154; 711/217; 711/209; 711/203; 711/147; 711/162; 711/130; 707/1; 707/202; 707/203; 707/204; 714/6; 714/27; 714/42; 714/54

(58) Field of Classification Search ............ 707/203; 711/6, 111, 154, 217, 209, 203, 147, 162, 711/130; 714/6, 27, 42, 54, 7, 710, 8
See application file for complete search history.

(56) References Cited

U.S. PATENT DOCUMENTS 6,629,264 B1 * 9/2003 Sicola et al. ............... 714/15
6,636,873 B1 * 10/2003 Carini et al. ............... 707/201
2002/0184516 A1 * 12/2002 Hale et al. .................. 713/200

FOREIGN PATENT DOCUMENTS

JP A-11-85408 3/1999

* cited by examiner

Primary Examiner—John Follansbee
Assistant Examiner—Ashok Patel
(74) Attorney, Agent, or Firm—Sughrue Mion, PLLC; Pavel I. Pogodin, Esq.

(57) ABSTRACT

The present invention provides improved techniques for managing storage resources, such as disk drives, I/O ports, and the like in a network based storage system according to a user position within the network. Embodiments according to the present invention can provide a relatively high performance storage access environment for the mobile users moving around a wide area. For example, in one applicable environment, there are several data centers in the wide area, and each data center has a local storage system that is connected to the other storage systems through a network. Copies of a user's volume can be made in some of the storage systems. A remote copy function is utilized for making real time copies of the user's volume.

14 Claims, 8 Drawing Sheets

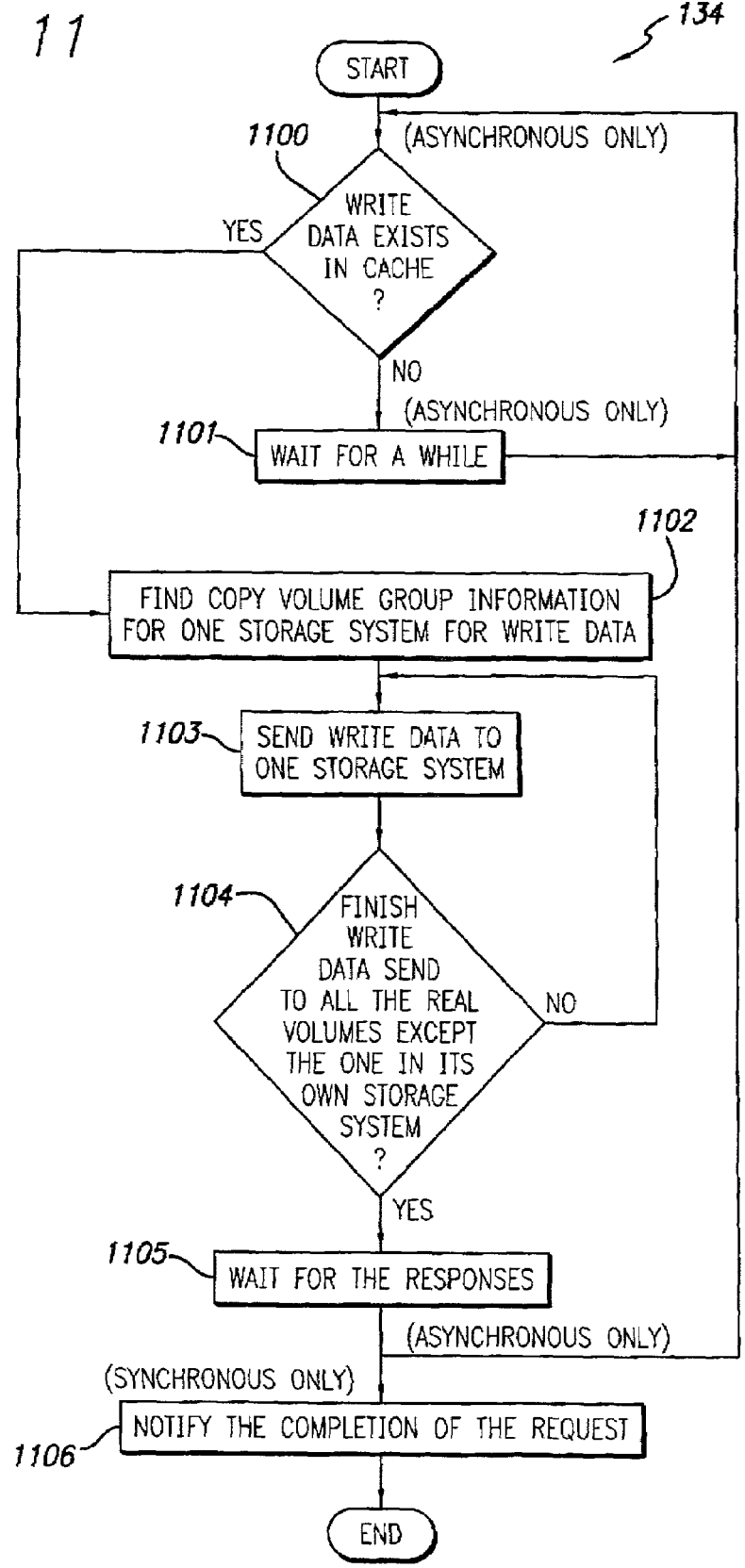

HIGH PERFORMANCE STORAGE ACCESS ENVIRONMENT

BACKGROUND OF THE INVENTION

The present invention relates generally to techniques for managing storage resources, and in particular to techniques for providing high performance storage access environment for the mobile users within a wide area.

The information technology revolution brings with it an ever increasing need for more storage capacity for business enterprises. It is expected that the average Fortune 1000 company's storage requirement will more than double in the coming years. In addition, growth has brought shortages of skilled persons in the information technology field. These challenges confront many companies facing the need to expand and improve their information technology assets. Increasingly, companies are turning to network based storage systems as a method of coping with the need to grow capacity in view of rapidly increasing demand. Further, with the introduction of wide area networks, storage systems have become able to span larger geographic distances than ever before.

While certain advantages to conventional technologies are perceived, opportunities for further improvement exist. For example, there are a lot of users who move around a wide area. However, conventional network based storage solutions do not readily adapt to the users that can change position in an area as large as Seattle to San Francisco, for example. Further, the managing of storage resources is often an on-going task that is conventionally performed by a host computer that uses the storage resources. In other words, using conventional approaches, the storage systems are largely confined to a local area.

What is needed are improved techniques for managing storage resources over a widely dispersed geographic area.

SUMMARY OF THE INVENTION

The present invention provides improved techniques for managing storage resources, such as disk drives, I/O ports, and the like in a network based storage system according to a user position within the network. Embodiments according to the present invention can provide a relatively high performance storage access environment for the mobile users moving around a wide area. For example, in one applicable environment, there are several data centers in the wide area, and each data center has a local storage system that is connected to the other storage systems through a network. Copies of a user's volume can be made in some of the storage systems. A remote copy function is utilized for making real time copies of the user's volume.

In a representative embodiment according to the present invention, a system is provided. The system comprises a plurality of data centers, including a first data center and a second data center. Each data center comprises a storage system and a host server. The system further comprises a directory server; at least one of a plurality of access gateways; a network interconnecting the plurality of data centers, the directory server, and the access gateway. In the system, responsive to input received via any of the at least one of a plurality of access gateways, any of the plurality of data centers may be configured as a primary (source) of data, and any of the plurality of data centers may be configured as a secondary (target) of data in a copy operation.

In a specific embodiment, responsive to the input received via any of the at least one of a plurality of access gateways, information about the first data center and the second data center is fetched from the directory server, and thereupon, the first data center may be configured as a primary (source) of data, and the second data center may be configured as a secondary (target) of data in a copy operation.

In another specific embodiment, responsive to a second input received via any of the at least one of a plurality of access gateways, the first data center may be reconfigured as a secondary (target) of data, and the second data center may be configured as a primary (source) of data in a second copy operation. In some specific embodiments, copy operations are synchronous, the first data center updating contents of storage from contents of a cache memory prior to being reconfigured to as a secondary (target) in the second copy operation.

In a further specific embodiment, the information fetched from the directory server comprises proximity information for a source of the input received via the at least one of a plurality of access gateways, and wherein the first data center is configured as a primary (source) of data, and the second data center is configured as a secondary (target) of data in the copy operation based upon the proximity information.

In a yet further specific embodiment, the plurality of data centers further comprises a third data center, the third data center being configured as another secondary (target) of data in a copy operation. In a yet further specific embodiment, a network interface provides connection between at least one of a plurality of access gateways and a user terminal. In a yet further specific embodiment, information associated with a virtual volume is stored in a plurality of real volumes in the storage system. In a yet further specific embodiment, a correspondence between the virtual volume and the plurality of real volumes in the storage system is stored in the directory server. In a yet further specific embodiment, a storage volume from the first data center and a storage volume from the second data center comprise a copy volume group. In a yet further specific embodiment, the directory server further comprising a log in process and a virtual volume information. In a yet further specific embodiment, the host server further comprises a copy volume group interface process, a read request issue process, and a write request issue process.

In a representative embodiment according to the present invention, a method is provided. The method comprises receiving a virtual volume name and network interface ID for a user; finding a virtual volume corresponding to the virtual volume name and network interface ID; selecting a real volume information corresponding to a data center to which the user is logged into; and determining whether the data center is primary. If the data center does not contain a primary volume, issuing a request to change a volume within the data center to a primary volume, waiting for a response to the request, re-setting a current primary volume, and setting the volume within the data center to be primary. The method also includes returning a real volume information for the volume within the data center set to primary.

In a representative embodiment according to the present invention, a method is provided. The method comprises receiving a request comprising a real volume address and a storage system address; finding a copy volume group corresponding to the real volume address and the storage system address of the request; finding a copy volume that is a current primary volume; and determining whether transfer type is synchronous. If the transfer type is synchronous, then requesting that the current primary volume synchronize cache, and waiting for a response. The method also includes issuing a request to change primary real volume; waiting for a response to the request; re-setting an indication that the current primary volume is primary; setting an indication that the real volume address and the storage system address of the request are now primary; and notifying of completion.

In a representative embodiment according to the present invention, a method is provided. The method comprises receiving write data; storing the write data in cache memory; and determining whether transfer type is synchronous. If the transfer type is synchronous, then sending write data to secondary volume, and waiting for response; and notifying of completion.

In a representative embodiment according to the present invention, a method is provided. The method comprises determining whether write data is stored in cache memory. If write data is not stored in cache memory, waiting and then performing determining whether write data is stored in cache memory again; finding copy volume group information for a storage system for the write data; sending the write data to the storage system; and determining if the write data is to be sent to another storage system. If the write data is to be sent to another storage system, then performing the finding, sending and determining again until all write data has been sent. The method also includes notifying of completion.

In a representative embodiment according to the present invention, an apparatus is provided. The apparatus comprises at least one of a plurality of storage devices; and a storage control unit. The storage control unit comprises a cache memory; a copy volume group information; a copy volume group definition process; a read request execution process; a write request execution process; a write data send process; and a write data receive process.

Numerous benefits are achieved by way of the present invention over conventional techniques. In some specific embodiments, when a user logs into the data center, the allocation system recognizes the current position of the user and the data centers whose storage systems have the copies of the user volume. Then the allocation system selects the data center to log in and let the user log in the selected data center. In some specific embodiments, the remote copy function is provided that has the capability to make a copy in the storage system of the selected data center the primary copy and the other copies the secondary copies, unlike conventional approaches, in which the primary copy and the secondary copy are fixed. In specific embodiments of the present invention, the primary and secondary copies are dynamically changed when the user moves around. In some specific embodiments of the present invention, a remote copy function is provided in which more than two copies of the volume can be made in order to obtain enhanced performance.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 11 illustrates a flowchart of a representative write data send process in a specific embodiment of the present invention.

DESCRIPTION OF THE SPECIFIC EMBODIMENTS

The present invention provides improved techniques for managing storage resources, such as disk drives, I/O ports, and the like in a network based storage system according to a user position within the network. Embodiments according to the present invention can provide a relatively high performance storage access environment for the mobile users moving around a wide area. For example, in one applicable environment, there are several data centers in the wide area, and each data center has a local storage system that is connected to the other storage systems through a network. Copies of a user's volume can be made in some of the storage systems. A remote copy function is utilized for making real time copies of the user's volume.

Figure 1:
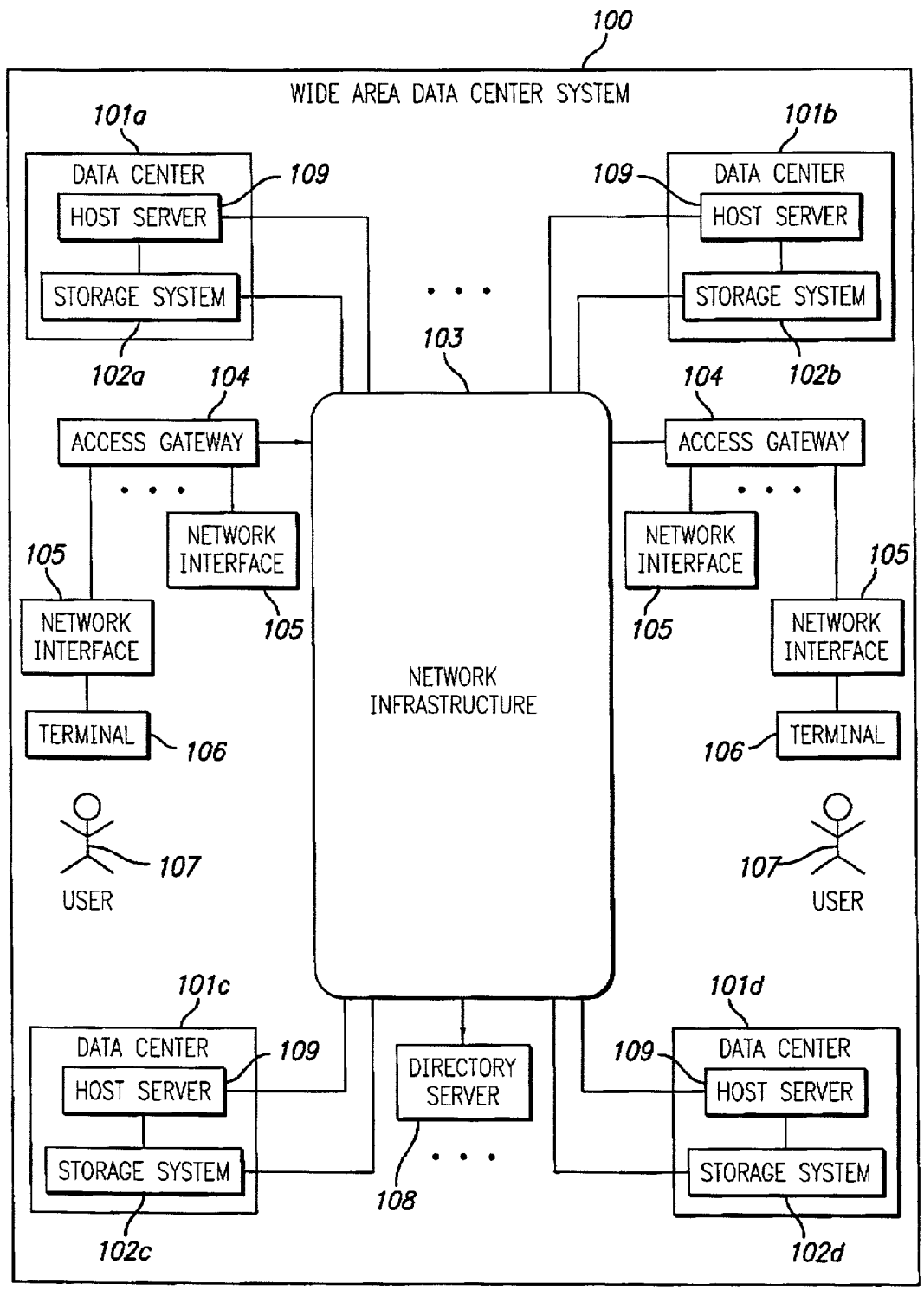
FIG. 1 illustrates a diagram of a representative wide area data center system in a specific embodiment of the present invention.

FIG. 1 illustrates a drawing of a representative wide area data center system in a specific embodiment of the present invention. As shown in FIG. 1, a wide area data center system 100 in a present embodiment comprises a plurality of data centers 101. Each data center 101 has a host server 109 and a storage system 102. Each host server 109 and each storage system 102 are connected to network infrastructure 103. An access gateway 104 provides access to a data center 101. Each access gateway 104 is also connected to network infrastructure 103. A network interface 105 is used to connect the terminal 106 to an access gateway 104. A user 107 connect his terminal 106 to a network interface 105 when he wants to access wide area data center system 100. A directory server 108 plays a role in selecting which data center 101 the user 107 should log into.

Figure 4:
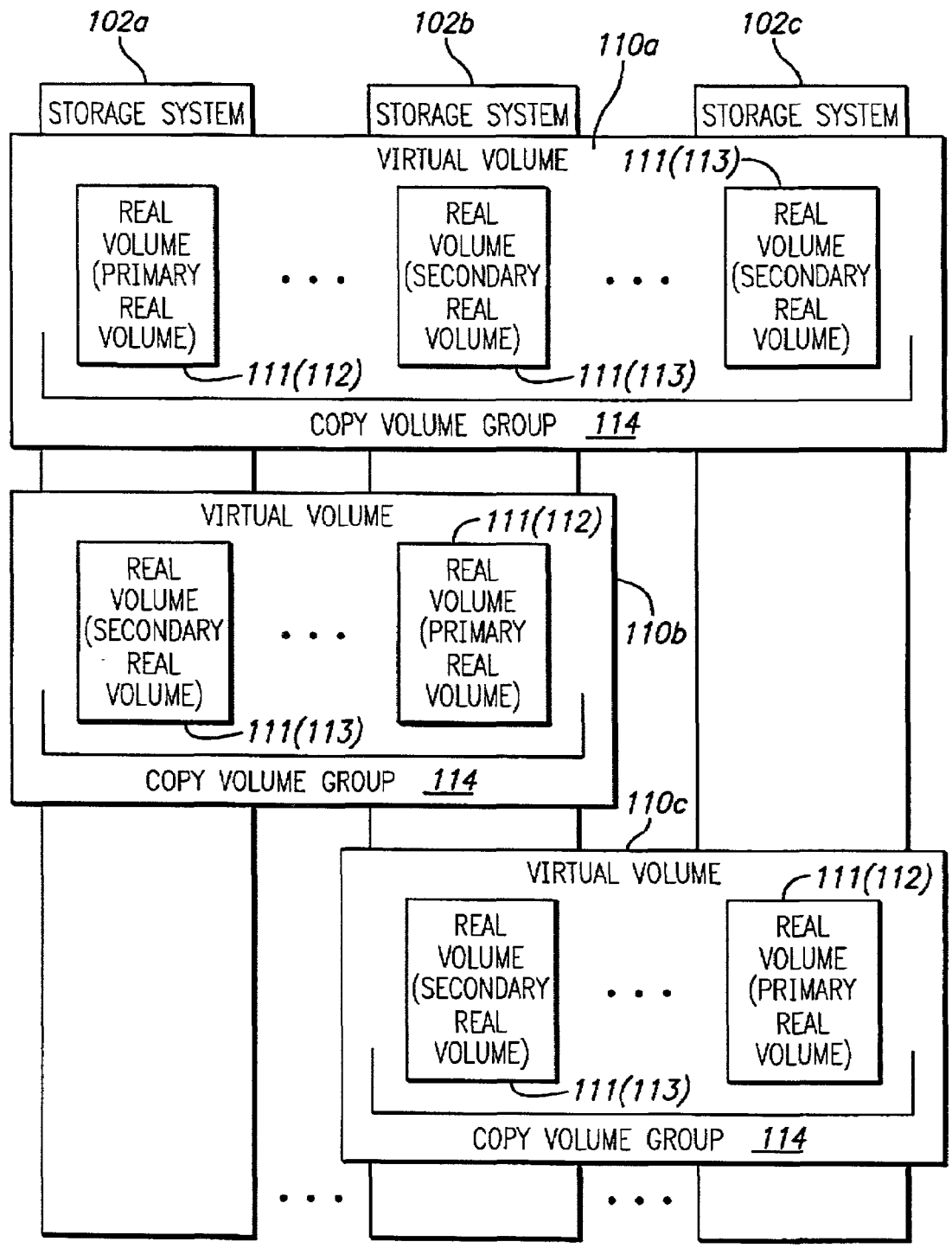
FIG. 4 illustrates a diagram of a representative storage system configuration in a specific embodiment of the present invention.

FIG. 4 illustrates a diagram of a representative storage system configuration in a specific embodiment of the present invention. In specific embodiments of the present invention, as shown in FIG. 4, a volume virtually seen from a user 107 of FIG. 1 is called a virtual volume. In the specific embodiment illustrated by FIG. 4, virtual volumes 110a, 110b, and 110c are shown. A virtual volume is distributed among one or more real volumes in each site. In this specific embodiment, there are at least two real volumes 111 for one virtual volume 110. A real volume 112 is actually included by a storage system 102. Each real volume 111 for one virtual volume 110 is arranged in the storage system 102 in a different data center 101. Each real volume 111 corresponding to one virtual volume 110 includes substantially similar content. A primary real volume 112 is a real volume 111 to which the read/write request from the user 107 is issued directly. Then the storage system 102 that includes the primary real volume 112 sends write data along with the write request to the storage system 102 that includes a secondary real volume 113. Secondary real volume 113 is also a real volume 111, but one to which data is written from a primary real volume 112. A group of real volumes 111 corresponding to one virtual volume is called a copy volume group 114.

In a function in which one storage system 102 sends write data to another storage system 102 is called a "remote copy function." Remote copy functions can serve a variety of user needs in various specific embodiments. For example, the remote copy function is useful for performing disaster recovery. If the local copy of information is destroyed due to a disaster, the remote copy is still available. Accordingly, in one specific embodiment, the number of the other storage systems 102 which one storage system 102 sends the data to is one. However, other specific embodiments of the present invention provide remote copy function that enables the user 107 to send updated data to more than one storage system 102.

Figure 5:
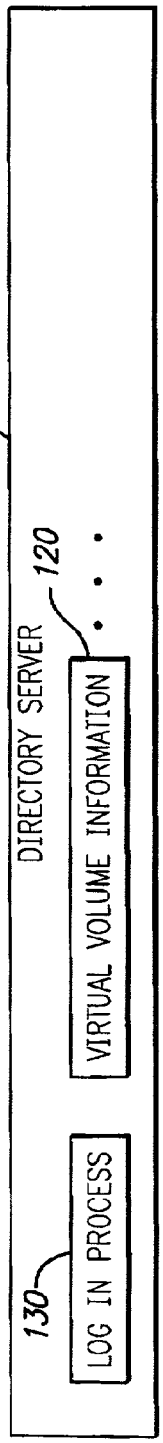
FIG. 5 illustrates a diagram of a representative director server in a specific embodiment of the present invention.

FIG. 5 illustrates a diagram of a representative directory server in a specific embodiment of the present invention. In the specific embodiment shown in FIG. 5, the directory server 108 comprises a virtual volume information 120 for each virtual volume 110, and a log in process 130. A representative format for virtual volume information in a specific embodiment according to the present invention will be described in further detail herein below with reference to FIG. 2. The log in process 130 commences when a log in request is received from a user 107 in FIG. 1. A representative log in process 130 in a specific embodiment of the present invention will be described in further detail herein below with reference to FIG. 8.

Figure 2:
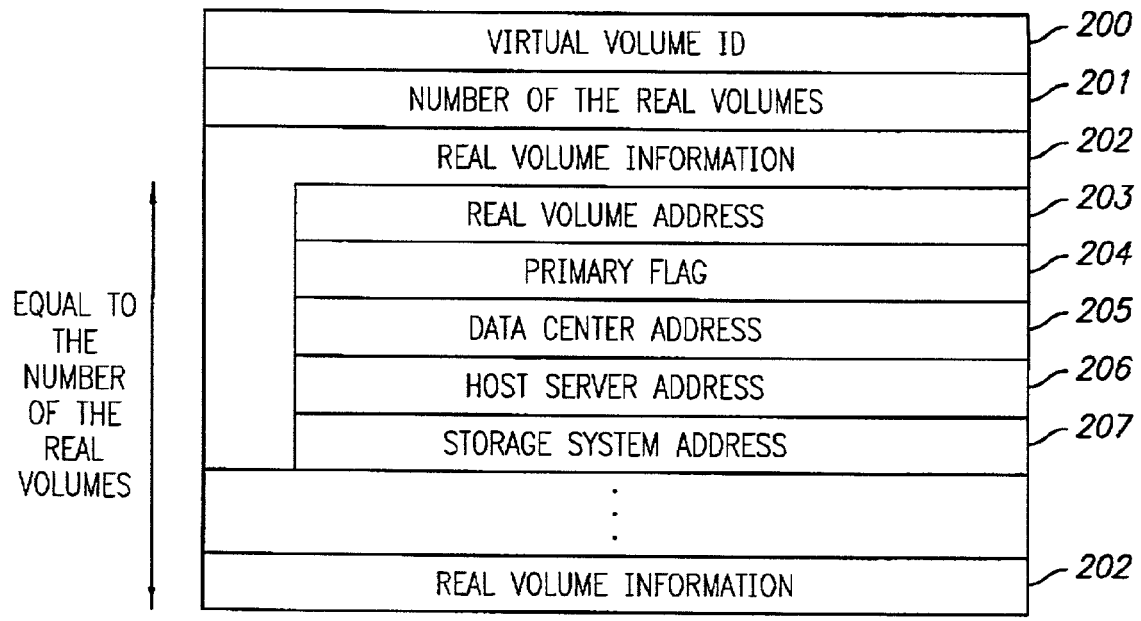
FIG. 2 illustrates a diagram of a representative format for virtual volume information in a specific embodiment according to the present invention.

FIG. 2 illustrates a diagram of a representative format for virtual volume information in a specific embodiment according to the present invention. A virtual volume ID 200 is an identifier of a virtual volume 110 corresponding to the virtual volume information 120. A number of the real volumes 201 is the number of the real volumes 111 which the corresponding virtual volume 110 includes. A real volume information 202 is the information about each real volume 111 which the corresponding virtual volume 110 includes. The quantity of individual entries of real volume information 202 is equal to the number of the real volumes 201 which the corresponding virtual volume 110 includes. Each real volume information 202 includes a real volume address 203, a primary flag 204, a data center address 205, a host server address 206 and a storage system address 207. A real volume address 203 shows the address of the corresponding real volume 111. The primary flag 204 is on when the corresponding real volume 111 is a primary real volume 112. The primary flag 204 is off when the corresponding real volume 111 is a secondary real volume 113. A data center address 205 shows the address of the data center 101 which includes the corresponding real volume 111. A host server address 101 shows the address of the host server 109 which is connected to the storage system including the corresponding real volume 111. A storage system address 207 shows the address of the storage system 102 which includes the corresponding real volume 111.

Figure 6:
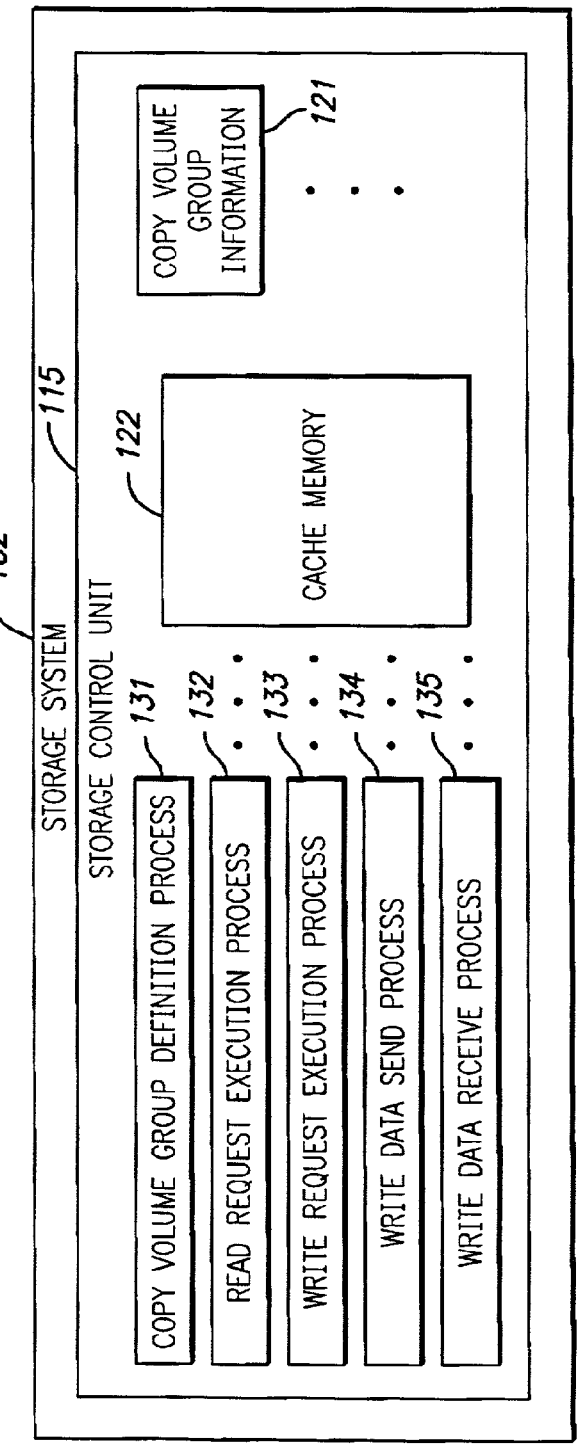
FIG. 6 illustrates a diagram of a representative storage system in a specific embodiment according to the present invention.

FIG. 6 illustrates a diagram of a representative storage system in a specific embodiment according to the present invention. In a specific embodiment, each storage system 102 has a storage control unit 115. The storage control unit 115 has a copy volume group information 121, a cache memory 122, a copy volume group definition process 131, a read execute process 132, a write request execute process 133, a write data send process 134, and a write data receive process 135. Each of these processes communicates with a corresponding process in a primary storage system and one or more secondary storage systems. For example, a write data send process 134 in the primary storage system will communicate with a write data receive process 135 in the secondary storage system. The copy volume group information 121 exists for every copy volume group 114 that includes a real volume 112 for the corresponding storage system 102. A representative format for copy volume group information in a specific embodiment according to the present invention will be described in further detail herein below with reference to FIG. 3.

Figure 3:
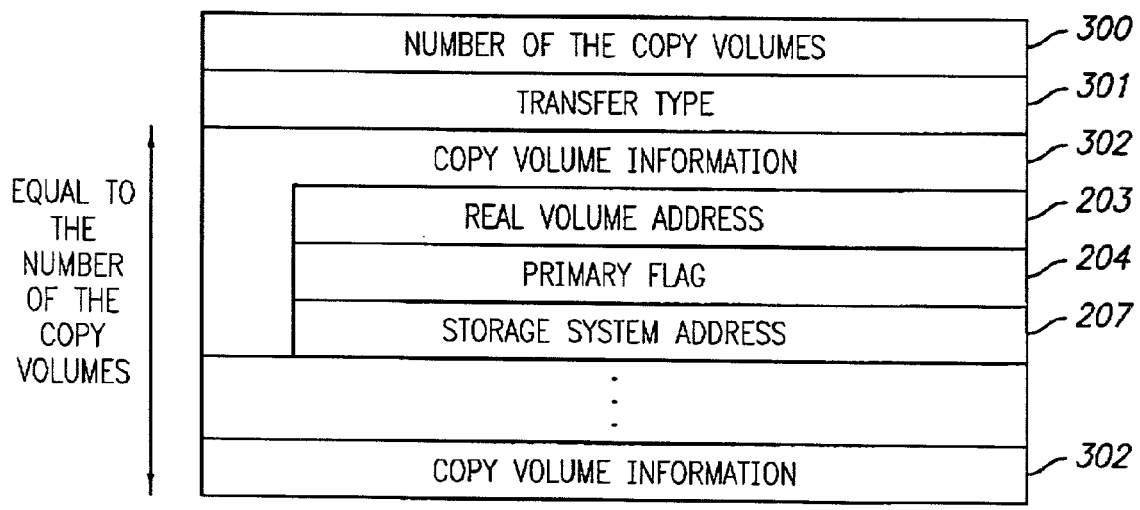
FIG. 3 illustrates a diagram of a representative format for copy volume group information in a specific embodiment of the present invention.

FIG. 3 illustrates a diagram of a representative format for copy volume group information in a specific embodiment of the present invention. As shown in FIG. 3, in a specific embodiment, the copy volume group information 121 comprises a number of the copy volume 300, which is the quantity of real volumes 111 included in the corresponding copy volume group. A transfer type 301 indicates whether write data is sent to the other storage systems synchronously or a synchronously in the corresponding copy volume group 114. The copy volume information 302 is the information for each real volume 111 which is included in the corresponding copy volume group 114. The quantity of entries of copy volume information 302 is equal to the quantity of the copy volumes 300. Each copy volume information 302 includes a real volume address 203, a primary flag 204, and a storage system address 207.

Figure 7:
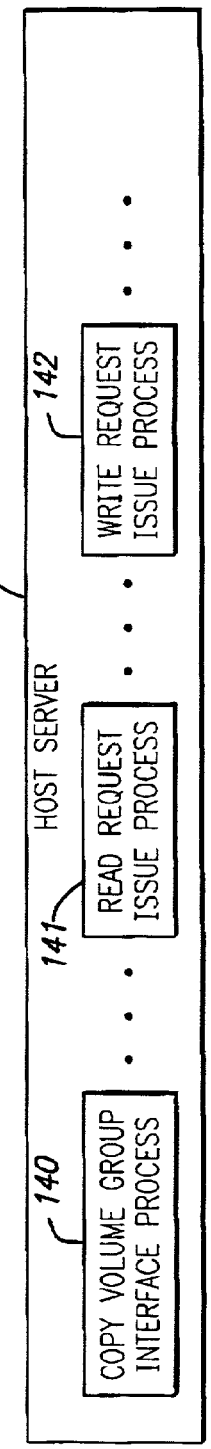
FIG. 7 illustrates a diagram of a representative host server in a specific embodiment of the present invention.

FIG. 7 illustrates a diagram of a representative host server in a specific embodiment of the present invention. The host server 109 comprises a copy volume group interface process 140, a read request issue process 141, and a write request issue process 142. The copy volume group interface process 140 in the host server 109 invokes a copy volume group definition process 131 in a storage system 102. A read request issue process 141 in the host server 109 invokes a read request execution process 133 in a storage system 102. A write request issue process 142 in the host server 109 invokes a write request execution process 132 in a storage system 102. These processes will be described in further detail herein below with reference to FIGS. 8–11 in specific embodiments of the present invention.

Figure 8:
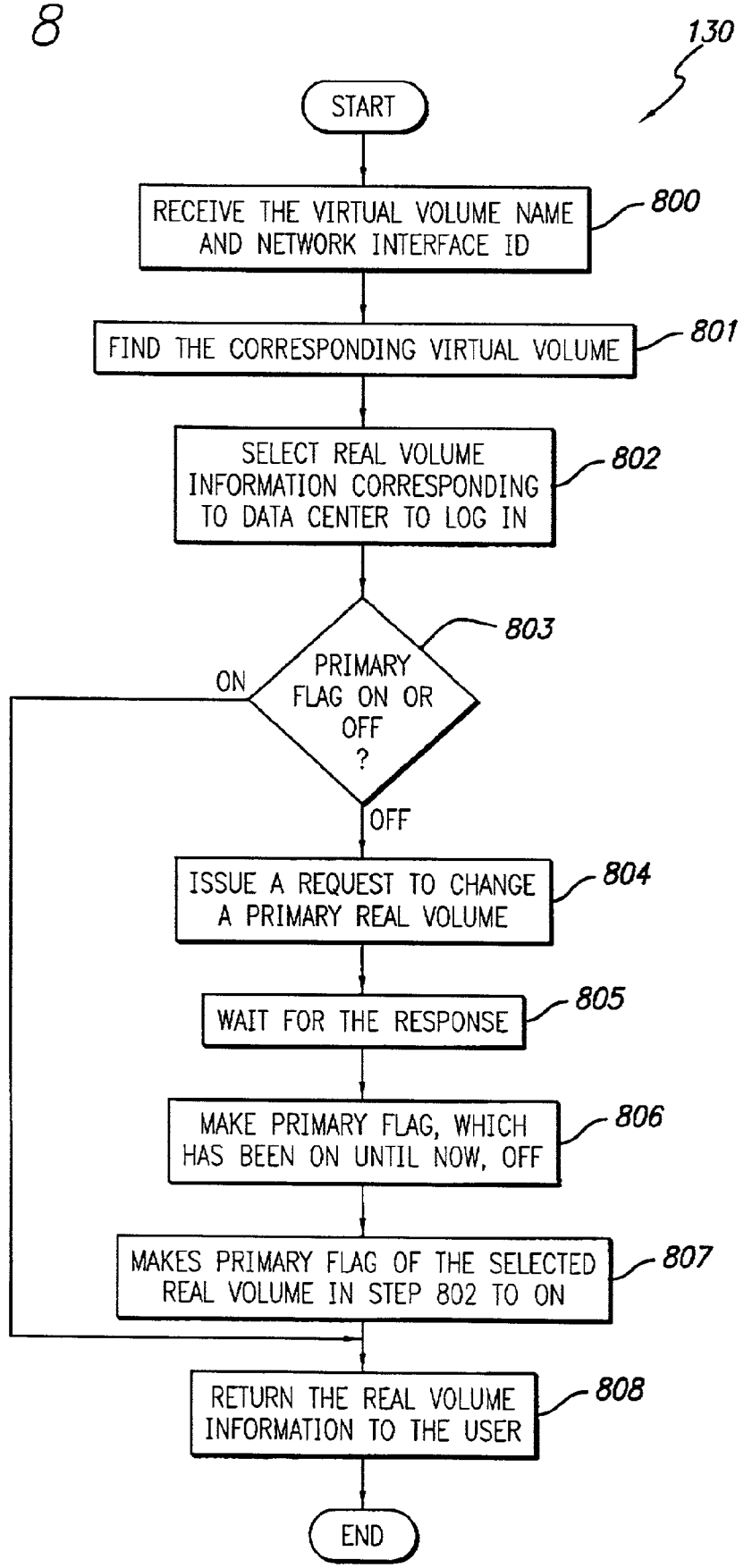
FIG. 8 illustrates a flowchart of a representative log in process in a specific embodiment of the present invention.

FIG. 8 illustrates a flowchart of a representative log in process in a specific embodiment of the present invention. A log in process 130 commences when a log in request is received from a user 107. In a step 800, a log in process 130 receives the name of a virtual volume 110, which the user 107 wants to access, and the ID of a network interface 105, to which the terminal 108 for the user 107 desiring access is connected. In a step 801, a log in process 130 finds the virtual volume 110 specified by a user 107 utilizing the name of a virtual volume 110 received in step 800. In a step 802, a log in process 130 selects the real volume information 202, which includes the data center 101, that the user 107 will access, by referring to the all real volume information 201 for the specified virtual volume 113. In this case, a data center 101 nearest to the network interface 105 for the terminal to which the user is connected should be selected, so that the user can get best performance storage access environment. In a step 803, a log in process 130 checks whether a primary flag 204 in the selected real volume information 202 is set to "on" or "off." If the primary flag 204 is set to "on," a log in process 130 continues processing at a step 808. If the primary flag 204 is set to "off," then, in a step 804, a log in process 130 issues a request to a copy volume group interface process 140 in the host server 109 specified by the selected real volume information 202. This request is a request to make the real volume 111 specified by the selected real volume information 202 a primary real volume 112. Further, the request includes a real volume address 203 and a storage system address 207 in the selected real volume information 202. Then in a step 805, a log in process 130 waits for a response from the host server 109. After receiving the response, in a step 806, a log in process 130 sets the primary flag 204 of the real volume which has been the primary volume until then to a value of "off" from the previous value of "on." In a step 807, a log in process 130 sets the primary flag 204 in the selected real volume information 202 for the real volume which is to become the new primary real volume to a value of "on" from the previous value of "off." Accordingly, by virtue of processing associated with steps 806 and 807, a primary volume is replaced with another volume. In step 808, a log in process 130 passes the selected real volume information 202 to the user 107. Of course, it is possible that a log in process 130 issues this request to a copy volume group definition process 131 in a storage system 102 in place of a copy volume group interface process 140.

The copy volume group interface process 140 is activated when receiving the request from a log in process 130 in step 804. The copy volume group interface process 140 passes the request to the copy volume group definition process 131 in the storage system 102 specified in the request. The copy volume group interface process 140 notifies the log in server 130 of completion of the request when it receives the notification of completion of the request from a copy volume group definition process 131.

Figure 9:
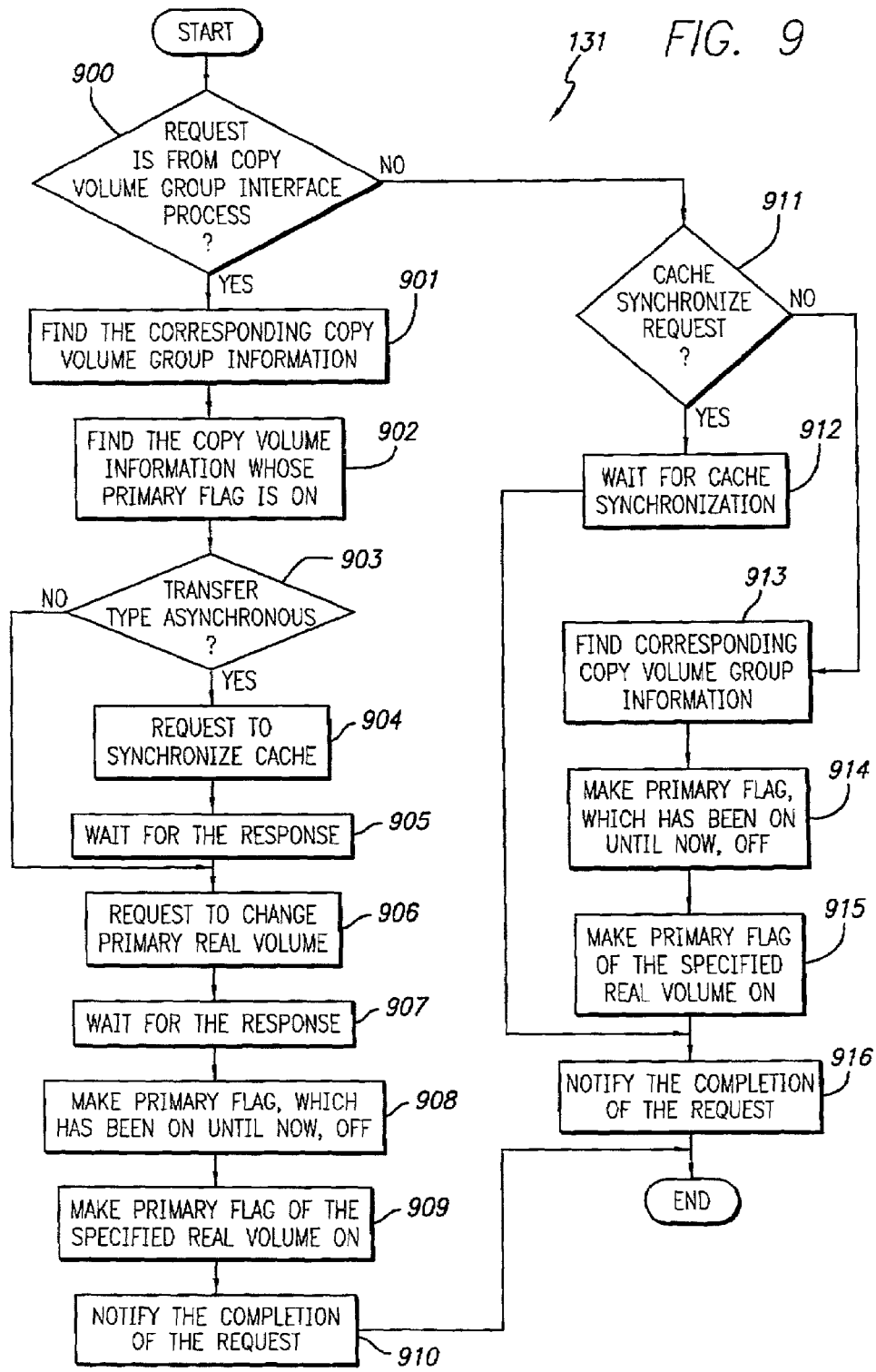
FIG. 9 illustrates a flowchart of a representative copy volume group definition process in a specific embodiment of the present invention.

FIG. 9 illustrates a flowchart of a representative copy volume group definition process in a specific embodiment of the present invention. A copy volume group definition process 131 begins processing when it receives a request from a copy volume group interface process 140 in a host server 109, or a copy volume group definition process 131 in another storage system 102. In a decisional step 900, it is determined whether the request was received from a copy volume group definition process 131 in the same storage system 102, or from another storage system 102. If the request was received from the same storage system 102, then processing continues with a step 901. Otherwise, if the request was received from a copy volume group definition process in another storage system 102, then processing proceeds with a step 911. In a step 901, a copy volume group definition process 131 finds the copy group information 121 which includes a real volume address 203 and a storage system address 207 specified by the received request. In step 902, a copy volume group definition process 131 finds the copy volume information 302 whose primary flag 204 is on in the selected copy volume group information 121. In a decisional step 903, a copy volume group definition process 131 checks whether the transfer type 301 shows synchronous type or a synchronous type. If it is a synchronous type, a copy volume group definition process 131 proceeds to a step 906. Otherwise, in a step 904, a copy volume group definition process 131 sends a request to synchronize the cache memory 122 to a copy volume group definition process 131 in the storage system 102 having an address that is equal to the storage system address 207 in the selected copy volume information in step 902, i.e., the copy volume information having a primary flag 204 set to on. Then in step 905 a copy volume group definition process 131 waits for the response from the other storage system 102. After receiving a response, the copy volume group definition process 131 sends requests to change a primary physical volume 112 to a real volume 111 to the copy volume group definition processes 135 in all of the other storage systems except its own storage system 102, which was included in the selected copy volume group information 121 in step 901. This request includes a real volume address 203 and a storage system address 207 received from a copy volume group interface process 140. Then, in step 907, a copy volume group definition process 131 waits for responses from the other storage systems 102. After receiving the responses, in step 908, a copy volume group definition process 131 sets a primary flag 204, which has been set to "on" until now, in the selected copy volume information 202 in step 902, to "off" in order to indicate that this volume is no longer primary. Then, in step 909, a copy volume group definition process 131 sets a primary flag 204 in the copy volume information 302, which includes a real volume address 203 and a storage system address 207 received from a copy volume group interface process 140, to a value of "on" from a value of "off" in order to indicate that this is the new primary volume. Then in step 910, a copy volume group definition process 131 notifies the copy volume group interface process 140 of the completion of the requested processing.

When the request is received from a copy volume group definition process 131 in another storage system, then, in step 911, a copy volume group definition process 131 checks whether the request is a request to synchronize the cache memory 122. If not, a copy volume group definition process 131 proceeds to a step 913. Otherwise, in a step 912, a copy volume group definition process 131 waits for the cache to synchronize. After the cache has been synchronized, a copy volume group definition process 131 continues processing with a step 916. Otherwise, in a step 913, a copy volume group definition process 131 finds the copy group information 121, which includes a real volume address 203 and a storage system address 207 specified by the received request.

In a step 914, a copy volume group definition process 131 sets a primary flag 204, which has been set to "on" until now, in the selected copy volume group information 121 in step 913, to "off" in order to indicate that this volume is no longer the primary volume. Then, in a step 915, a copy volume group definition process 131 sets a primary flag 204 of the copy volume information 302 which includes a real volume address 203 and a storage system address 207 specified by the received request, to "on" in order to indicate that this is now the primary volume. Then in a step 916, a copy volume group definition process 131 notifies the copy volume group definition process 140 in the other storage system 102 of the completion of the requested processing.

After receiving the real volume information including a real volume address 203, a primary flag 204, a data center address 205, a host server address 206 and a storage system address 207, a user 107 communicates with a host server 109 specified by the received host server address 206. In a specific embodiment, a read request issue process 141 and a write request issue process 142 are considered to exist by every real volume. Accordingly, in a specific embodiment, a read request and a write request can execute in parallel on each real volume. Then a user 107 sends a real volume address and a storage system address 207 to a read request issue process 141 and a write request issue process 142 corresponding to the specified real volume 111 in the specified host server 109. A read request issue process 141 reads data from the specified real volume 111 in the specified host server 109 according to the request from a user 107. In a specific embodiment, a read request issue process 141 issues a read request including the real volume address 203 specified by the user 107. A write request issue process 142 writes data to the specified real volume 111 and a storage system address 207 in the specified storage system 102 by a user 107 according to the request from a user 107. In a specific embodiment, a write request issue process 141 issues a write request including the real volume address 203 and the storage system address 207 specified by the user 107 to the specified storage system 102. In a specific embodiment, a read request execution process 132 a write request execution process 133, a write data send process 134, and a write data receive process 135 in a storage system 102 are considered to exist by every real volume 111. A read request execution process 132 sends the requested data of the specified real volume 112 by the read request to a read request issue process 141.

Figure 10:
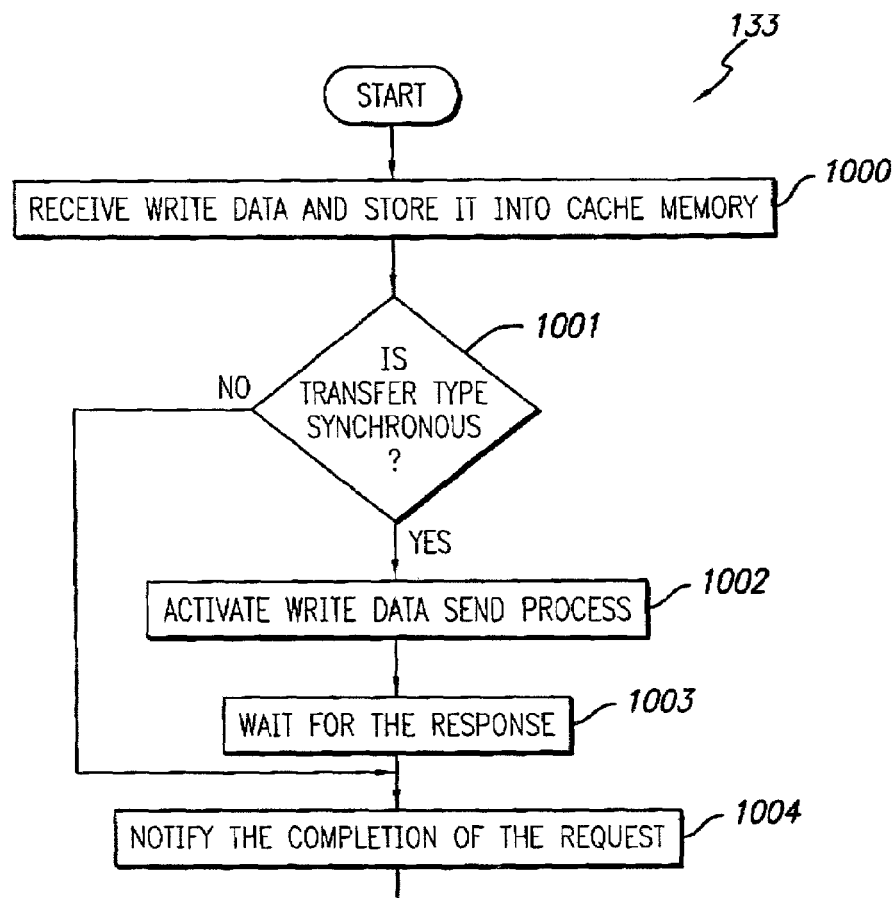
FIG. 10 illustrates a flowchart of a representative write request execution process in a specific embodiment of the present invention.

FIG. 10 illustrates a flowchart of a representative write request execution process in a specific embodiment of the present invention. As shown in FIG. 10, in a specific embodiment, a write request execution process 133 commences when a write request is received from a write request issue process 142 in host 109. In a step 1000, a write request execution process 133 receives write data from a write request issue process 142 and stores the write data into the cache memory 122. In a step 1001, a write request execution process 133 finds a copy volume group information 121 which includes a real volume address 203 specified by the received write request. Then, in step 1001 a write request execution process 133 checks whether the transfer type 301 of the found copy volume group information 121 is synchronous or a synchronous. If it is an a synchronous transfer, processing continues with a step 1004. Otherwise, if it is a synchronous transfer, then in a step 1002, a write request execution process 133 activates the corresponding write data send process 134. Then, in step 1003, a write request execution process 133 waits for a response from a write send process 134. After receiving the response, a write request execution process 134 moves to step 1004. In a step 1004, a write request execution process 133 notifies the completion of the write request. Alternatively, a read request execution process 132 and a write request execution process 133 receives read/write requests from a terminal 105 of a user 107 directly, and execute the requested processing.

FIG. 11 illustrates a flowchart of a representative write data send process in a specific embodiment of the present invention. As shown in FIG. 11, in a specific embodiment, the write data send process 134 performs steps 1100 and 1101 when the data transfer type 301 in the copy volume group information 121 which includes the real volume address 203 of the corresponding real volume 111 is a synchronous. In a step 1100, a write data send process 134 checks whether write data for the corresponding real volume 112 exists in the cache memory 122. If the write data exists in the cache memory, then processing continues with a step 1102. If the write data does not exist, then, a write data send process 134 waits for a while in step 1101, and then continues with step 1100 again. Alternatively, when the corresponding data transfer type 301 is synchronous, a write data send process 134 is activated by a write request execution process 133 and starts processing from a step 1102. In a step 1102, a write data send process 134 finds the copy volume group information 121 that includes the real volume address 203 of the corresponding real volume 111. In a step 1103, a write data send process 134 sends write data to one real volume 112 whose real volume address 203 is included in the found copy volume group information 121. In a step 1104, a write data send process 134 checks if the sending of write data to all of the real volumes 111 except the real volume 111 in the storage system 102 in which the write data send process is executing, whose real volume address 203 are included in the corresponding copy volume group information 121. If write data sending has finished, a write data send process 134 waits for the responses in a step 1105. If the write data has sending has not finished, then processing continues with the step 1103. After receiving the responses, when the corresponding data transfer type 301 is a synchronous, a write data send process 134 continues processing back at the step 1100. When the corresponding data transfer type 301 is synchronous, then, in a step 1106, a write data send process 134 notifies the write request issue process 133 of completion of the requested processing. In a step 1103 of FIG. 11, before receiving the completion of the send processing, a write data send process 133 starts the next send processing. So, a write data send process 133 can execute several send processes in parallel. Thus effective data transfer can be realized. In a specific embodiment, another technique for effective data transfer uses a broadcast transfer that can be applied to a plurality of sending processes.

Figure 12:
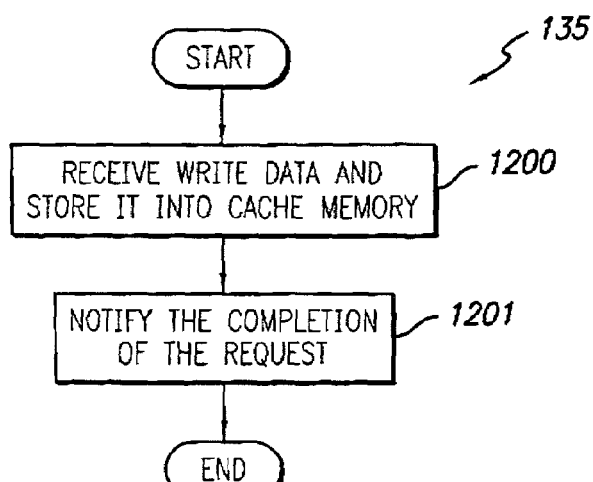
FIG. 12 illustrates a flowchart of a representative write data receive process in a specific embodiment of the present invention.

FIG. 12 illustrates a flowchart of a representative write data receive process in a specific embodiment of the present invention. As shown by FIG. 12, in a specific embodiment, the write data receive process 135 starts processing when it receives write data from a write data send process 134. In a step 1200, a write data receive process 135 receives write data and stores the write data into a cache memory 122. Then, in a step 1201, the write data receive process 135 notifies the completion of the requested processing to a write data send process 134.

The preceding has been a description of the preferred embodiment of the invention. It will be appreciated that deviations and modifications can be made without departing from the scope of the invention, which is defined by the appended claims.

What is claimed is:

1. A system comprising:
  a plurality of data centers, including a first data center and a second data center, each data center comprising:
    a storage system comprising a plurality of physical volumes storing information associated with at least one virtual volume; and
    a host server;
  a directory server comprising information on the first data center and the second data center and information on correspondence between the at least one virtual volume and the plurality of physical volumes of the storage system;
  a plurality of access gateways;
  a network interconnecting said plurality of data centers, said directory server, and said plurality of access gateways; wherein each of said plurality of data centers is accessible from at least one of said plurality of access gateways and wherein, responsive to input received via any one of said plurality of access gateways, the information about the first data center and the second data center is fetched from the directory server, the fetched information comprising proximity information for a source of said input and any of said plurality of data centers may be configured as a primary (source) of data, and any of said plurality of data centers may be configured as a secondary (target) of data in a copy operation based on the fetched information.

2. The system of claim 1, wherein, responsive to a second input received via any of said plurality of access gateways, said first data center may be reconfigured as a secondary (target) of data, and said second data center may be configured as a primary (source) of data in a second copy operation.

3. The system of claim 2, wherein copy operations are synchronous, said first data center updating contents of storage from contents of a cache memory prior to being reconfigured to as a secondary (target) in said second copy operation.

4. The system of claim 1, wherein said plurality of data centers further comprises a third data center, said third data center being configured as another secondary (target) of data in a copy operation.

5. The system of claim 1, further comprising a network interface that provides connection between at least one of a plurality of access gateways and a user terminal.

6. The system of claim 1, wherein a storage volume from said first data center and a storage volume from said second data center comprise a copy volume group.

7. The system of claim 1, said directory server further comprising a log in process and a virtual volume information.

8. The system of claim 1, said host server further comprising a copy volume group interface process, a read request issue process, and a write request issue process.

9. A system comprising:
a plurality of data centers, including a first data center and a second data center, each data center comprising:
a storage system comprising a plurality of physical volumes storing information associated with at least one virtual volume; and
a host server;
a directory server comprising information on the first data center and the second data center and information on correspondence between the at least one virtual volume and the plurality of physical volumes of the storage system;
a plurality of access gateways;
a network interconnecting the plurality of data centers, the directory server, and the plurality of access gateways; wherein each of the plurality of data centers is accessible from at least one of the plurality of access gateways and wherein, responsive to input received via any one of the plurality of access gateways, the directory server is operable to furnish information on the first data center and the second data center, the furnished information being indicative of a proximity of the one of the plurality of access gateways associated with the received input and at least one data center and any of the plurality of data centers is operable to initiate a bi-directional data copying operation with any other of the plurality of data centers.

10. The system of claim 9, wherein the first data center is selected from the plurality of data centers based on the furnished information.

11. The system of claim 9, wherein each of the plurality of data centers is operable to act as a primary (source) or a secondary (target) in the data copying operation.

12. The system of claim 11, wherein each of the plurality of data centers is configurable as the primary (source) or the secondary (target) based on a proximity information received from the directory server in response to the input.

13. The system of claim 9, wherein data stored in the storage system of each of the plurality of data centers is organized into at least one virtual volume.

14. The system of claim 13, wherein the storage system of each of the plurality of data centers stores information associating the at least one virtual volume with a corresponding physical volume.

* * * * *